United States Patent [19]

Buter

[11] 3,988,975
[45] Nov. 2, 1976

[54] COOKING UTENSIL HAVING BOIL-CONTROL MEMBER

[76] Inventor: Edward J. Buter, 160 Shoreline East, Point Sanilac, Mich. 48469

[22] Filed: Sept. 18, 1975

[21] Appl. No.: 611,212

[52] U.S. Cl. .................................... 99/415; 99/418
[51] Int. Cl.² ............................................ A47J 37/12
[58] Field of Search .................... 99/415, 410–411, 99/412–413, 414, 416–417, 418, 449, 450, 403

[56] References Cited
UNITED STATES PATENTS

| 893,805 | 7/1908 | Kline | 99/418 |
| 1,200,741 | 10/1916 | Lindgren | 99/418 X |
| 1,273,119 | 7/1918 | Allis | 99/418 |
| 1,356,432 | 10/1920 | Eidt | 99/418 |
| 1,627,285 | 5/1927 | Hubbard | 99/418 |
| 1,976,616 | 10/1934 | Kinnicutt | 99/418 |
| 2,650,536 | 9/1953 | Russell | 99/416 |
| 3,908,534 | 9/1975 | Martin | 99/415 X |

FOREIGN PATENTS OR APPLICATIONS

| 528,298 | 6/1931 | Germany | 99/415 |
| 10,321 | 10/1894 | United Kingdom | 99/415 |

Primary Examiner—Leonard D. Christian
Assistant Examiner—Arthur O. Henderson
Attorney, Agent, or Firm—Charles W. Chandler

[57] ABSTRACT

A cooking utensil having a perforated metal disc disposed in the bottom of the utensil to prevent a liquid from boiling over when the utensil is placed over heat.

5 Claims, 2 Drawing Figures

COOKING UTENSIL HAVING BOIL-CONTROL MEMBER

BACKGROUND OF THE INVENTION

This invention relates to cooking utensils and more particularly to a utensil having a perforated disc in the bottom of the cooking container for preventing a liquid in the container from boiling over.

A problem with conventional utensils used for cooking foods in liquid form is that occasionally the food overheats and boils over the top edge of the utensil, thereby creating a mess. A common way for preventing such an occurrence is for the cook to carefully watch the food or to lower the heat to such an extent that boiling is prevented, but the rate of cooking is retarded.

SUMMARY OF THE INVENTION

The broad purpose of the present invention is to provide a disc which is disposed in the bottom of a conventional cooking utensil to prevent the food from boiling out of the utensil. The disc has a pattern of perforations of a size and spacing such that even though the food may become overheated, it does not boil over.

These and other objects of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
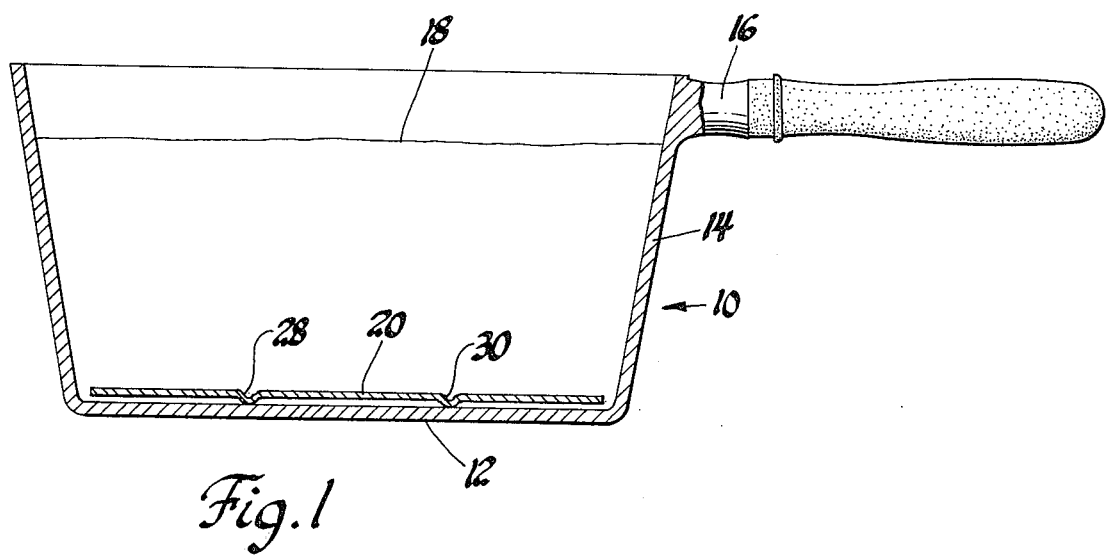
FIG. 1 - is a cross-section through a cooking utensil having a boil-control member disposed in the bottom of the utensil to control boiling in accordance with the invention, and FIG. 2 - is an enlarged side view of the boil-control member of FIG. 1.
Figure 2:
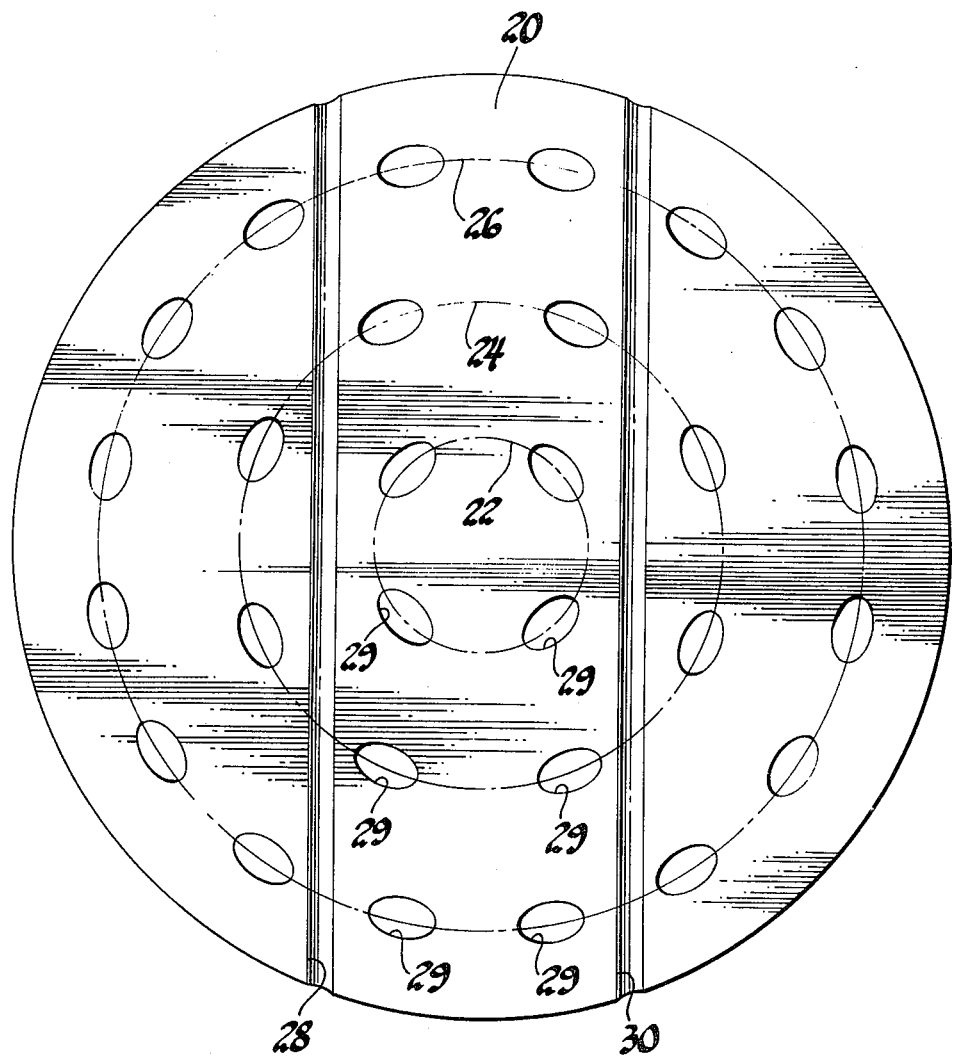

Referring to the drawing, FIG. 1 illustrates a conventional cooking container 10 having a generally planar base 12 adapted to be disposed on a stove (not shown), over a source of heat, and upstanding sidewall 14 connected to the base to form a container for boiling water, cooking soup or the like. A handle 16 is connected to the sidewall for the cook to manipulate the container. For purposes of illustration, a liquid food 18 is disposed in the container and has a temperature such that it tends to boil when overheated.

A preferrably planar boil-control member 20 is disposed in the bottom of cooking container 10 in face-to-face relationship with base 12. Boil-control member 20 preferrably has a diameter less than that of cooking container 14 and although illustrated as having a circular perimeter to accomodate most conventional cooking containers, it could be square or have any shape to accomodate a utensil having a non-circular configuration. Boil-control member 20 is preferrably formed of a non-rusting material such as aluminum and it is to be noted that it has a perimeter that lies in substantially the same plane as the mid-section of member 20.

The diameter of member 20 is chosen to accomodate the size of containers in which it is to be used. Preferably the diameter is chosen such that member 20 covers at least about 80% of the bottom of the container 10. For most conventional containers, the diameter range would be from 3½ inches to 8 inches.

Member 20 has three circular rows 22, 24, and 26 of similarly shaped elongated perforations 29. The size of each perforation is preferably one-fourth by three-eighths inches. The shape of the perforations can vary, for example, they could be round, star shaped, crescent shaped, and the like. The diameter of the perforations, depending upon the particular effectiveness, can range one-sixteenth of an inch to 1 inch.

The gauge of member 20 can also vary from one-sixty-fourth of an inch to one-eighth of an inch, however, in the preferred embodiment, the thickness is one-sixteenth of an inch.

Member 20 may also be formed with a pair of ridges 28 and 30, as illustrated in FIG. 1. The size of the ridges depends upon the diameter of member 20 and the number of ridges preferably varies from 1 to 8 inches.

In use, boil-control member 20 is disposed in the bottom of cooking utensil 10 and food 18 prepared in the conventional manner. Should food 18 tend to overheat, member 20 prevents the food from boiling over the top edge of wall 14, even though the food may experience a very rigorous boiling rate.

The advantage of member 20 is that it prevents the food from boiling over and creating the mess that normally accompanies such an accident.

Having described my invention, I claim:

1. A combination comprising:
    a cooking utensil having a substantially planar base and an upstanding sidewall connected to the base to form a container for cooking a liquid;
    a liquid disposed in the container, the liquid being capable of boiling when exposed to heat, and having such a depth in the container as to be suited for boiling over the top edge of the sidewall; and
    a thin, substantially planar boil-control member disposed in said liquid on the base of the cooking utensil in a substantially face-to-face relationship with the base, said boil-control member having a perimetric edge disposed in substantially the same plane as the mid-section of said member and a pattern of perforations so formed as to prevent the liquid from boiling over the top edge of the utensil sidewall at the time that the utensil base is exposed to heat.

2. A combination as defined in claim 1, in which the boil-control member has a circular perimetric edge.

3. A combination as defined in claim 1, in which the boil-control member has a diameter less than that of the utensil base.

4. A combination as defined in claim 1, in which the boil-control member has a plurality of perforations disposed in a circular array.

5. A combination as defined in claim 4, in which each perforation is elongated and has a diameter of about three-eighths of an inch by one-fourth of an inch.

* * * * *